United States Patent [19]

Briggs et al.

[11] Patent Number: 4,522,775

[45] Date of Patent: Jun. 11, 1985

[54] APPARATUS AND METHOD FOR PRODUCING MULTILAYERED LAMINATES

[75] Inventors: Jerald E. Briggs, St. Charles, Ill.; Henry Pfeutzenreuter, Alta Loma, Calif.

[73] Assignee: American Can Company, Greenwich, Conn.

[21] Appl. No.: 445,261

[22] Filed: Nov. 29, 1982

Related U.S. Application Data

[63] Continuation-in-part of Ser. No. 354,636, Mar. 4, 1982, abandoned.

[51] Int. Cl.³ .............................................. B29D 23/04
[52] U.S. Cl. ..................................... 264/173; 264/514; 264/515; 425/133.1; 425/462
[58] Field of Search ..................... 264/173, 515, 514; 425/133.1, 462

[56] References Cited

U.S. PATENT DOCUMENTS

| | | | |
|---|---|---|---|
| 3,457,337 | 7/1969 | Turner | 264/515 |
| 3,493,997 | 2/1970 | Albert et al. | 425/133.1 |
| 3,546,743 | 12/1970 | Roth | 425/133.1 |
| 4,047,868 | 9/1977 | Kudo et al. | 425/462 |
| 4,149,839 | 4/1979 | Iwawaki et al. | 425/133.1 |
| 4,218,416 | 8/1980 | Gokcen | 264/541 |
| 4,234,663 | 11/1980 | Catte et al. | 264/DIG. 69 |
| 4,297,092 | 10/1981 | Goron | 264/514 |
| 4,402,889 | 9/1983 | Bonis | 264/DIG. 69 |
| 4,410,602 | 10/1983 | Komoda et al. | 264/37 |

FOREIGN PATENT DOCUMENTS

| | | | |
|---|---|---|---|
| 2536851 | 2/1977 | Fed. Rep. of Germany | 425/462 |
| 50-4167 | 1/1975 | Japan | 428/475.8 |
| 52-51464 | 4/1977 | Japan | 264/173 |
| 55-107429 | 8/1980 | Japan | 264/515 |
| 55-39448 | 10/1980 | Japan | 264/173 |

*Primary Examiner*—Jeffery Thurlow
*Attorney, Agent, or Firm*—Stuart S. Bowie; Douglas W. Wyatt

[57] ABSTRACT

A multi-layer laminate structure comprises a separate layer of scrap produced from the several thermoplastic resins used in making the laminate structure. In a preferred construction, the multi-layer laminate structure comprises an outer thermoplastic polyolefin layer, an inner thermoplastic polyolefin layer and an intermediate oxygen barrier layer preferably made of ethylene-vinyl alcohol copolymer. An adhesive layer bonds the barrier layer to the inner polyolefin layer and a separate scrap layer is disposed interiorly of the outer polyolefin layer. A second adhesive layer bonds the scrap layer to the intermediate barrier layer. Containers having excellent oxygen barrier properties and good transparency are made by forming a parison from the multilayer laminate structure and blow molding the parison to the desired container shape.

Apparatus are described for producing multi-layered parisons of polymeric materials for producing such structures in which the relatively thin layers of the structure are formed into a laminate within the apparatus before being joined to a relatively thick layer.

17 Claims, 6 Drawing Figures

APPARATUS AND METHOD FOR PRODUCING MULTILAYERED LAMINATES

RELATED APPLICATION

This application is a continuation-in-part of patent application Ser. No. 354,636 filed Mar. 4, 1982, abandoned.

FIELD OF THE INVENTION

This invention relates to apparatus and method for forming a multi-layered parison containing at least two relatively thin layers and one relatively thick layer. The parison may be employed for the formation of containers such as bottles and the like by blow molding.

BACKGROUND OF THE INVENTION

Multi-layered laminate structures have long been used to make containers for a variety of products wherein, due to industrial requirements and specifications, it is not possible to use containers made from a single plastic material. In packaging foods, liquids such as various juices, sanitary articles and a host of other products, the container wall must withstand attack by oxygen or some of the ingredients of the packaged product which often tend to permeate through the container wall.

It has, by now, become well known to make multi-layered laminate structures from thermoformable plastics and to make containers therefrom by injection molding or blow molding techniques, and numerous thermoplastic resins have been disclosed and recommended for this purpose. Some of these thermoplastic materials and the composite laminated structures made therefrom are described in U.S. Pat. Nos. 3,560,325; 3,595,740; 3,882,259; 3,955,697; 4,182,457 and 4,234,663, to cite a few.

As mentioned in U.S. Pat. No. 4,234,663, which issued to Catté et al on Nov. 18, 1980, when multi-layer foil structures are used to make containers by thermoforming of the foil, considerable amount of "scrap" is obtained which may be as high as 50% of the total weight of the initially coextruded materials. If the scrap cannot be included in the multi-layered laminate structure, it constitutes a waste which must be disposed of with consequent economic disadvantages.

In their aforementioned patent, Catté et al disclose re-introduction of at least part of the scrap into the multi-layer foil structure as a "supplementary" layer. The scrap-containing layer of Catté et al, however, is constituted by a mixture of the scrap with sufficient amounts of adhesive, which is a graft copolymer of a styrenic monomer on a polyolefinic substrate.

In an article by Muneki Yamada entitled "Oriented Multi-Layer Containers For Food: Solid Phase Pressure Formed Cups and Stretch-Blow Molded Bottles", presented on Mar. 17-19, 1981 at the "5th Annual International Conference On Oriented Plastic Containers", the author discusses the technology of solid phase pressure forming and stretch-blow molding in the manufacture of multi-layer containers. With reference to FIGS. 2 and 3, the author describes a 7-layer structure which comprises a scrap layer interposed between a polypropylene layer and an adhesive layer with no significant reduction in clarity (transparency of the containers) provided the thickness of the scrap layer is within certain critical thickness ratio to the other layers.

At page 5, the Yamada article refers to U.S. Pat. No. 4,182,457 for making "oriented" containers. This patent, however is basically concerned with making transparent containers obtained by orienting the thermoplastic polyolefin olefin layer during stretch blow molding of the parison.

So far as it is known, there is not, at the present, a totally satisfactory method of utilizing all the scrap in making a satisfactory multi-layer laminate for forming containers.

Various apparatus for forming a multi-layered parison and blow molding the parison into a container of the desired shape are known. See, for example, U.S. Pat. Nos. 4,047,868; 4,297,092; 3,802,826; 3,447,204; 3,478,139; 3,546,743; 4,042,661; 4,125,585; 4,134,952; 4,152,104; and 4,281,981. The common features of these apparatus include an annular discharge flow passageway formed between a cylindrical flow tube and a die body, an annular discharge orifice at the downstream end of the annular discharge flow passageway through which the parison or multi-layered laminate structure is extruded, feed passageways which supply resin material to the apparatus for an individual resin layer and connecting passageways which join the feed passageways to the annular discharge flow passageway at junctions where an individual resin layer is added to the multi-layered laminate flowing from upstream of the junction.

In U.S. Pat. No. 4,047,868 the use of pressure rings to control the relative flow of resin material in the connecting passageways and the thickness of the individual layers is taught. Use of annular accumulation chambers to distribute material flowing into the feed passageways circumferentially to form more uniform layers is taught in U.S. Pat. Nos. 4,297,092; 4,152,104; 4,042,661; 3,546,743; 3,478,139; and 3,447,204. Rotation of the die body about the mandrel to provide more uniform layers is described in U.S. Pat. No. 3,802,826. Methods of controlling thickness and concentricity of the layers are taught in U.S. Pat. Nos. 4,047,868; 3,546,743; and 3,446,204.

A principal object of the various apparatus of the several patents mentioned above was to produce multi-layered structures with good roll geometry, that is a gauge thickness of substantially uniform depth across the width. Another object was to provide uniform deposition of a relatively thin molten layer of polymer onto a relatively thick molten layer of polymer under conditions of laminar flow without causing turbulence leading to fusion of the molten layers, uneven laydown of one layer upon the other or aberations which ultimately lead to delaminations when the finished product is subjected to mechanical stress.

These problems become particularly difficult when a relatively thin layer is to be laminated to a relatively thick layer. It is nonetheless important to be able to form laminates including one or more thin layers. For example, a container might be formed with an inner layer, an adhesive layer and an oxygen barrier layer. The inner layer may be formed with a thermoplastic polyolefin, the adhesive layer with a carboxylic acid modified polyolefin and the barrier layer (if oxygen is to be excluded) of a saponified copolymer of ethylene and vinyl acetate. The first mentioned polymers are relatively inexpensive. The last mentioned polymers are specialty chemicals and quite expensive. For economic reasons, therefore, it is important that the expensive polymers be laid down in thin layers. It is equally important for in use performance that the thin layers have good roll geometry, that they completely cover the thick layer and that there be no weak areas subject to delamination under mechanical stress. These ends are difficult to achieve in conventional equipment utilized for the preparation of parisons for blow molding.

It is, accordingly, an object of the present invention to provide a multi-layer laminate structure including a distinct and separate layer of scrap produced from the co-extrudate formed during coextrusion of the different layers of several thermoplastic materials.

It is a further object of this invention to provide a method for efficient and economical utilization of the scrap when making containers from multi-layer laminate structure comprising several thermoplastic materials.

It is also an object of the present invention to make packaging containers from multi-layer laminated structures which include a scrap layer, wherein the container has, inter alia, excellent resistance to oxygen permeability and transparency.

It is a further object of the present invention to provide novel improved apparatus for making a multi-layered parison for blow molding which produces parisons reliably despite variations in the thickness of the layers.

It also an object of this invention to provide an improved apparatus for producing multi-layered structures with layers of uniform thickness and concentricity.

SUMMARY OF THE INVENTION

A multi-layer laminate structure is provided which includes a separate layer of scrap made from regrind of the extrudate of the various resins used in making the laminate structure. Preferably, the multi-layer laminate structure comprises an outer thermoplastic polyolefin layer, an inner thermoplastic polyolefin layer and an intermediate oxygen barrier layer. The outer and inner polyolefin layers are preferably made of polypropylene, particularly crystalline isotactic polypropylene, and the intermediate barrier layer is preferably made of ethylene-vinyl alcohol copolymer. A first adhesive layer bonds the inner polyolefin layer to the intermediate barrier layer. A separate scrap layer may be disposed interiorly of the outer polyolefin layer and a second adhesive layer bonds this scrap layer to the intermediate barrier layer. Alternatively, the separate scrap layer may be interposed between the inner polyolefin layer and the second adhesive layer, or it may be interposed at both of said positions.

In order to make a container, the multi-layer structure is coextruded into a parison tube which is then placed in a blow mold and inflated by injection of air, under pressure, to from the container.

This invention also provides improved blow molding apparatus for formation of parisons for blow molding into containers of any desired shape.

The apparatus is especially useful for the preparation of the preferred multilayered structures of this invention.

BRIEF DESCRIPTION OF THE DRAWINGS

The objects and features of the present invention will be made more apparent by reference to the accompanying drawings, in which.

DETAILED DESCRIPTION OF THE INVENTION

According to the broad principles of this invention, the several layers are first coextruded to form a parison tube which is then molded and shaped into the desired container form. It must be mentioned, however, that the formation of the parison tube and the container are well known techniques in the plastic industry. For example, one such method is described in U.S. Pat. No. 4,079,850 wherein a multi-layer resin in the molten state is coextruded to form a parison. A pair of split molds are disposed around the parison and the split molds have such a configuration that when they are in register with each other, they define a cavity which corresponds to the shape of the desired container. By injecting air, under pressure, the parison is blow molded to form the container.

In its broadest aspects, the apparatus of this invention comprise extrusion molding apparatus in which two or more relatively thin layers of polymeric material are formed into a laminate within the apparatus before being joined to one or more relatively thick layers. The principle of the invention will be well understood by reference to FIG. 3. For convenience, the various parts of the apparatus will be broadly defined with reference to FIG. 3 and only the principal parts will be identified. They will be more specifically defined with reference to the other figures.

Figure 3:
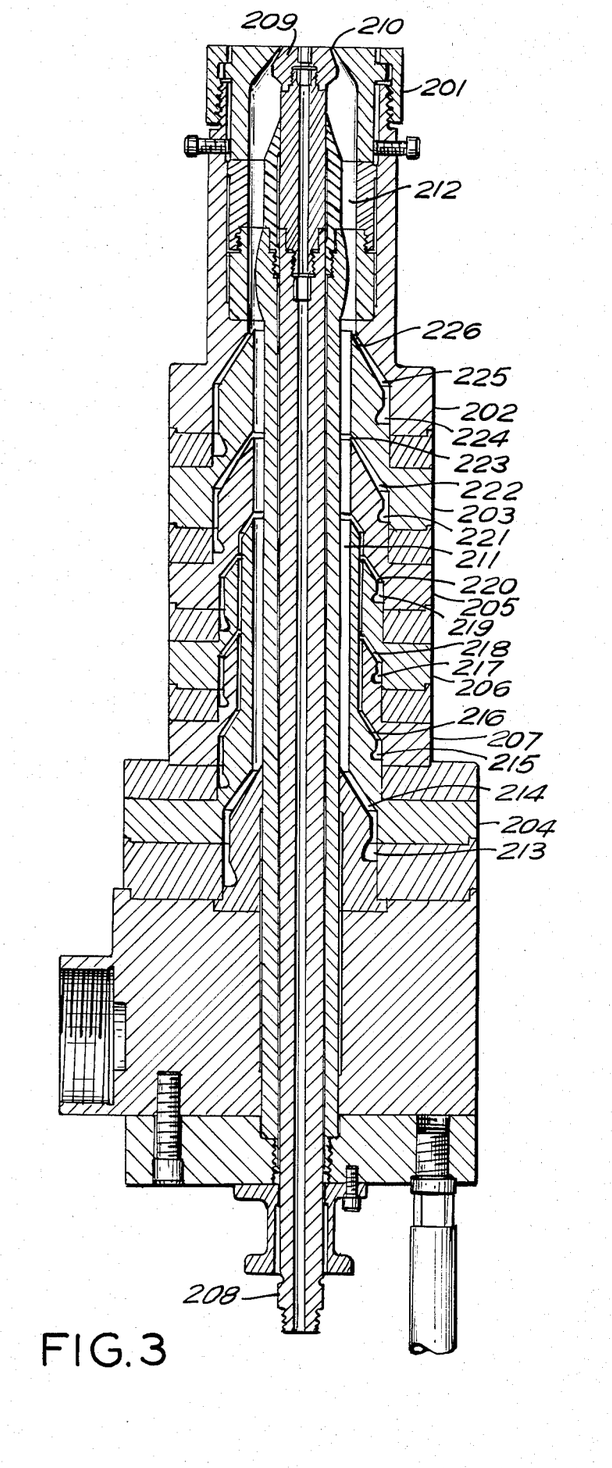
FIG. 3 is a schematic illustration of an apparatus of this invention which particularly illustrates its principal features.

FIG. 3 schematically represents an apparatus of the invention including a segmented die block with an extrusion die block segment 201; principal subextrusion die block segments 202, 203 and 204; subextrusion die block segments 205, 206 and 207.

There is a hollow central flow tube 208 terminating in a core pin 209 the end portion of which terminates at an orifice 210 in the extrusion block 201. There is a principal tubular channel 211 around the flow tube communicating with a delivery channel 212 and with various passageways for polymer materials to be described hereinafter.

Figures 1, 4:
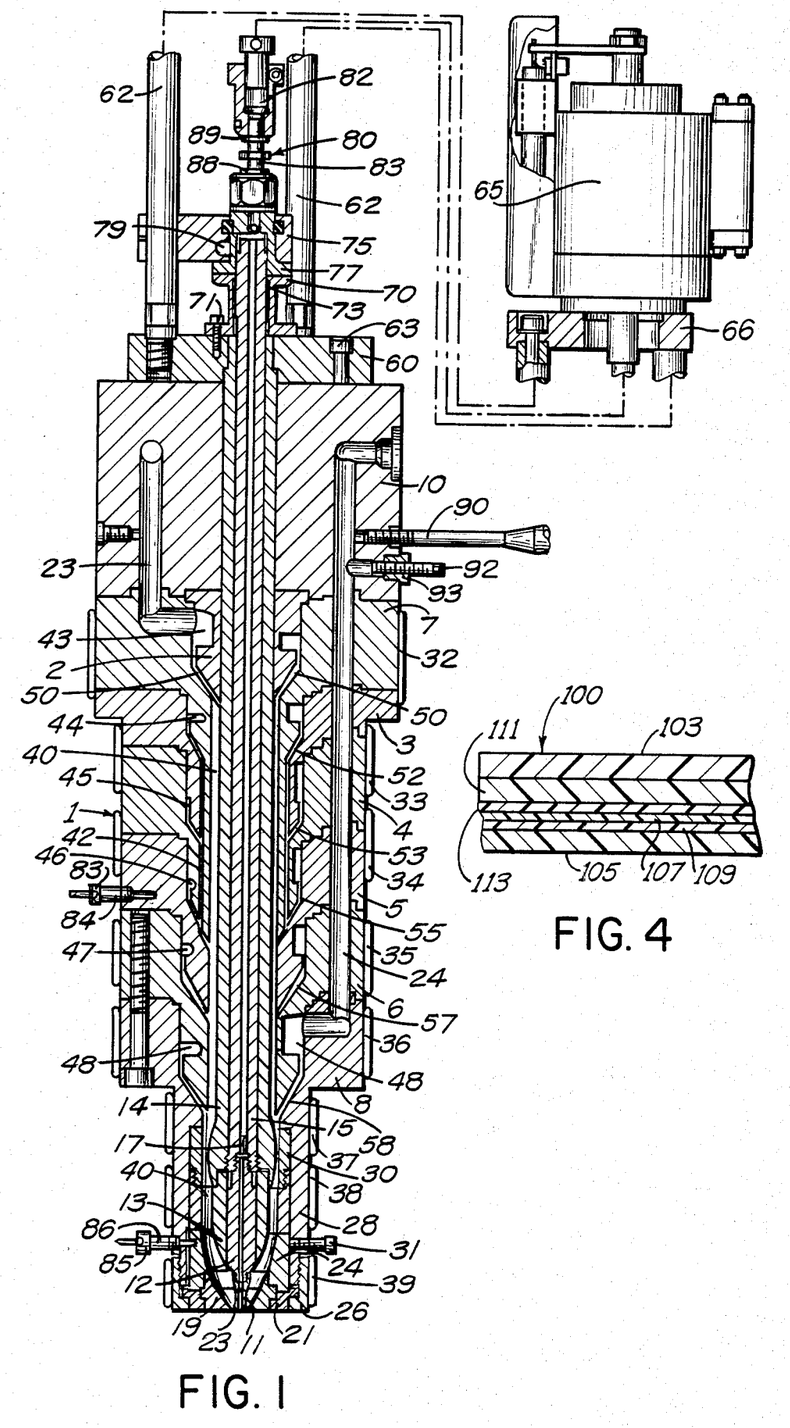
FIG. 1 is a sectional view of a preferred embodiment of the novel apparatus of this invention for forming multi-layered parisons.
FIG. 4 is a schematic sectional view illustrating the arrangements of the various layers of a six layer laminate structure, including a separate scrap layer, made in accordance with a preferred embodiment of this invention.

The schematic of FIG. 3 is designed to produce a preferred laminated structure 100 of this invention illustrated in FIG. 4. In FIG. 4 there is an inner thermoplastic polyolefin layer 105 and progressing outwardly a first adhesive layer 109, an oxygen barrier layer 107, a second adhesive layer 113, a scrap layer 111, and an outer thermoplastic polyolefin layer 103. The inner and outer layers and the scrap layers may be regarded as structural layers and, as will be seen, they are relatively thick, of the order of 12 to 18 mils. The adhesive and barrier layers are relatively thin, i.e. 0.5 to 2 mils. A particular advantage of the apparatus of this invention is that it makes it possible to form extremely thin layers completely around a facing surface of relatively thick layers in a uniform manner while avoiding the problems aforesaid.

Reverting now to FIG. 3, the inside structural layer is formed from a polymer in principal subextruder die block 204 which is formed with a polymer accumulation reservoir 213. There is a passageway 214 leading from the reservoir to the principal tubular channel 211. Adhesive layer 109 is extruded from auxiliary subextrusion die block 207 with accumulation reservoir 217 and second passageway 218 which leads into first passageway 216. The second adhesive layer 113 is extruded from auxiliary subextrusion die block 205 with accumulation reservoir 219 and third passageway 220 leading to first passageway 216. The oxygen barrier layer 107 is extruded through the extrusion block 206 and the outer layer 103 is extruded through extrusion block 202.

After the juncture of first passageway 216 and third passageway 220, the first passageway joins the principal tubular channel. There is thus formed within the extrusion apparatus a laminate composed of the thin adhesive layers and the barrier layer. This laminate is brought into confluence with the thick inner layer within the extrusion apparatus.

The scrap layer 111 is extruded from principal subextruder 203 formed with accumulation reservoir 221 and passageway 222. It forms a junction with the principal tubular channel 211 at junction 223.

The principal tubular channel joins the delivery channel 212 and the six layered parison exits the apparatus around pin 209 through exit orifice 210.

As will be explained more fully hereinafter, in preferred embodiments of the invention the flow tube is programmable, that is it can move vertically within a fixed tube or mandrel. The size of the orifice 210 can also be adjusted.

The invention will now be explained in more detail with reference to FIGS. 1 and 2. While the description will refer principally and for purposes of illustration to the preferred embodiments, those skilled in the art will recognize that many variations from the embodiments actually described are possible without varying from the spirit or scope of the invention. For example, certain of the layers, such as the scrap layer or the outside layer can be omitted. The apparatus can be arranged to form a three layered structure of thick structural layer and thin adhesive and barrier or other layer. The apparatus can be arranged so that the thick layer is the inner or the outer layer. More principal subextruders can be added to the vertically arranged subextruder column to form laminated structures with more than six layers.

Figure 2:
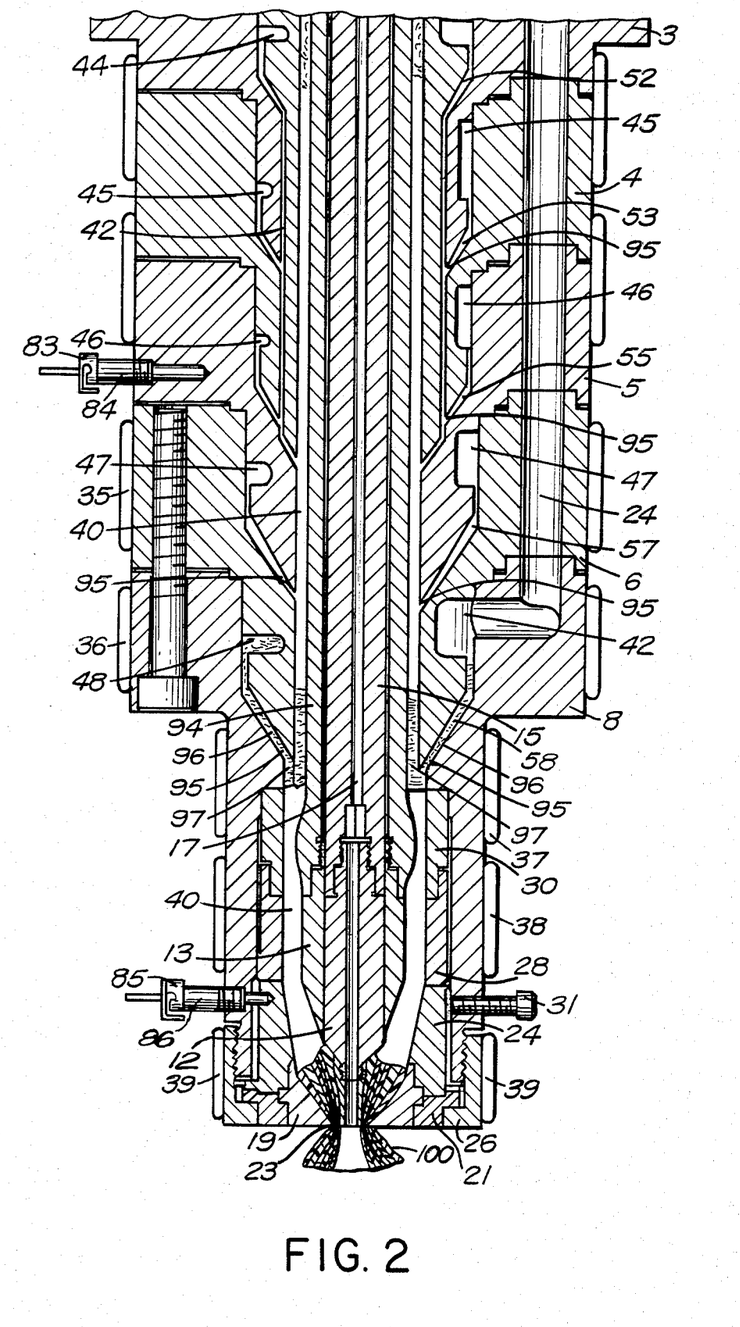
FIG. 2 is an enlarged sectional view of the preferred embodiment shown in FIG. 1.

The preferred embodiment of the novel apparatus 1 for forming the multi-layered parison tube of this invention shown in FIGS. 1 and 2 comprises a segmented die block including a set of principal and auxiliary subextruders 7, 3, 4, 5, 6 and 8 mounted vertically in order from bottom to top to define a longitudnal direction on an adapter block 10 and a substantially cylindrical mandrel 14 passing through coincident central holes in extruders 7, 3, 4, 5, 6, and 8 and adapter block 10. The annular space between mandrel 14 and the extruders 7, 3, 4, 5, 6 and 8 defines a principal annular discharge channel 40 through which the multi-layered laminate flows. The mandrel 14 is cylindrical and has a concentric central cylindrical cavity through which a programming flow tube 15 passes. The flow tube is vertically moveable within the mandrel. A blow pin 11 is mounted at the downstream end portion of mandrel 14 on cylindrical pin holder 12 which is attached directly to programming flow tube 15. The pin holder 12 is held in position by pin holder sleeve 13 attached to the downstream end of mandrel 14. There is thus defined a hollow unit through which air or other gas may be forced to blow mold the parison.

A principal subextruder 8 comprises the downstream end of the segmented die block and, as shown, consists of an upstream cylindrical portion of substantially greater radius than a downstream portion. The exterior surface of the end portion of top block 8 is threaded to engage and hold an end cap 26 which consists of a cylindrical pipe portion whose bottom interior surface is threaded and an interiorly directed top lip. A bushing ring 21 which forms a seat for bushing 19 is conformed to be held in place by end cap 26. Bushing 19 has a central interior nozzle cavity and central annular orifice 23 surrounding but spaced from the blow pin 11 to form an exit orifice through which the multi-layered laminate can be extruded.

The cylindrical, central cavity of top extruder 8 has additionally three pipe-shaped pieces, a bushing adapter 24, top adapter sleeve 28, and bottom adapter sleeve 30 mounted therein in tandem from top to bottom whose interior surfaces together with the exterior surface of the mandrel 14 define the downstream portion or delivery channel of the principal tubular discharge channel 40.

The downstream end of bushing adapter 24 abuts against bushing 19 and bushing ring 21. The concentricity of the extrudate may be partially controlled by an axially disposed adapter set screws 31 passing through top block 8 to press against bushing adapter 24.

In the preferred embodiment shown, a central longitudinal air shaft 17 passes through programming flow tube 15, pin holder 12, and blow pin 11 and provides a means by which air or other vapor is introduced to prevent the parison walls from collapsing during extrusion and to blow mold the parison.

Each of subextruder die blocks 6, 5, 4, 3 and 7 comprises a cylindrical bottom portion with a central hole therein and a downstream extending sleeve top portion so conformed to fit into the cylindrical bottom portion of the adjacent extruder or subextruder so as to form annular accumulation reservoirs 48, 47, 46, 45, 44 and 43 in the segmented die block to hold the melted thermoplastic resin material used for each individual layer of the six-layered laminate. Resin material is fed to the reservoirs 48, 47, 46, 45, 44 and 43 from an external source which is not shown. The resin is distributed circumferentially by feed passageways, flow blocks 6, 5, 4, 3 and 7 and adapter block 10. The annular accumulation reservoir 48 in principal subextruder die block 6 is fed by feed passageway 24 having an axially disposed inlet in adapter block 10. Annular accumulation reservoir 43 formed between flow sleeve 2 and principal subextruder die block 6 is fed by feed passageway 23.

The feed passageways can be equipped with a regulating system such as pressure transducer 90 and a choke pin 92 mounted in choke pin adapter 93 for regulating the flow rate of polymeric material. The accumulation reservoirs 43, 47 and 48 are connected directly to the principal tubular discharge flow channel 40 by annular connecting passageways 50, 57 and 58. However, annular discharge reservoirs 44, 45 and 46 are conected to an auxiliary discharge flow channel 42 which leads to principal tubular flow channel 40 by annular connecting passageways 52, 53 and 55.

Auxiliary discharge flow channel 42 is substantially smaller in diameter than principal tubular flow channel 40 into which it is connected. The use of an auxiliary discharge flow channel 42 allows preforming a three-layered laminate consisting of two adhesive layers and a barrier layer which may be formed completely around the inner layer without causing imperfections in the final products.

It will be understood from the description and from the figures that the accumulation reservoirs and the polymer passageways leading from the accumulation reservoirs to the first or auxiliary passageway and to the principal tubular channel 40 may be defined by facing surfaces of adjacent extruders. They may be, however, conveniently formed in the blocks themselves. This is especially true of the accumulation reservoirs.

The passageways are tapered, i.e. the diameter of the downstream end is less than that of the end closer to the accumulation reservoirs. Therefore, the pressure of the molten polymer at the downstream end is greater than at the upstream end. As a result, the stream of molten resin becomes laminar flow so that there is reduced turbulence as each polymer stream joins another polymer stream.

Heat may be supplied to the die block by any convenient means. The extruders and subextruders may be insulated by ceramic bands 39, 38, 37, 36, 35, 34, 33 and 32 as shown. Thermocouples may be mounted in the extruders and subextruders 8, 6, 5, 4, 3 and 7; for example, thermocouple 85 is mounted in adapter 86 and senses the temperature in principal subextruder 8 and thermocouple 83 in adapter 84 senses the temperature in auxiliary subextruder 5.

The blow pin 11 is also positioned by a pin orientation bar 75 axially attached to and holding the programming flow tube 15 by bar adapter 77. Orientation bar 75 is held in position by clamp pin 79 and bar adaper 77 is supported on the bottom of adapter block 10 by cylindrical flanged bushing 70 attached to a mounting plate 60 which is fixed to adapter block 10 by mounting bolt 63. Air may be admitted to air shaft 17 by means of the couplet 80 which passes air to the end of programming flow tube 15 through bar adapter 77 from air inlet 82.

Movement of programming flow tube 15 within mandrel 14 may be controlled by an electronic parison programmer 65, for example, a Hunker Programmer available from Hunker Acroboratories, Inc. The programmer 65 is attached to programmer base plate 66 which is connected to mounting plate 60 by tie rods 62.

In the preferred practice of this invention as illustrated in FIG. 4, the laminate structure has an intermediate gas and oxygen barrier layer of ethylene-vinyl alcohol copolymer, outer and inner structural layers of a thermoplastic polyolefin, a separate scrap layer adjacent to the outer polyolefin layer and two adhesive layers, one interposed between the intermediate barrier layer and the scrap layer, and the other is interposed between the intermediate barrier layer and the inner polyolefin layer.

The polyolefins which are suitable in forming the outer and inner layers of the laminate structure are thermoplastic olefinic polymers such as e.g., high and low density polyethylene, polypropylene and blends of these.

Both adhesive layers are preferably made of maleic anhydride modified polypropylene wherein the polypropylene backbone is modified with maleic anhydride moieties. One such adhesive is available from Mitsui, Japan, under the Trademark ADMER QB 530. In general, however, polypropylene modified with ethylenically unsaturated carboxylic anhydrides may be used as the adhesive layers for the present laminate structure.

It must be mentioned that the aforementioned adhesives are particularly well suited when polypropylene or propylene-ethylene random copolymers constitute the outer and inner structural layers. However, when this layer is made of polyethylene, it is preferable to use a different adhesive such as, for example, the Plexar adhesives manufactured by Chemplex Company, Rolling Meadows, Ill. These adhesives are a blend of ethylene-vinyl acetate copolymer and a graft copolymer of polyethylene and a dicarboxylic acid anhydride.

The scrap layer is made of regrind of the coextrudates of the different thermoplastic layers used to form the parison tube. The nature of the scrap and its incorporation into the laminate structure will hereinafter be described in detail in connection with the description of the process of this invention.

As mentioned above, the multi-layer laminate structure generally designated as 100 has an outer polyolefin structural layer 103, an inner polyolefin structural layer 105 and an intermediate oxygen barrier layer 107. The inner polyolefin layer 105 is adhesively bonded to the intermediate barrier layer 107 by the adhesive layer 113.

All the layers are coextensively bonded along their respective junctions with no interlaminar separation between the respective layers of the laminate structure.

In order to form the laminate structure, the thermoplastic resins used to make the different layers are coextruded in the molten state through an extrusion apparatus, preferably an embodiment of the apparatus described herein, to form the parison tube. The parison tube is then blow molded by injection of air or other vapor, under pressure, and is shaped into a container in a separate container mold. The excess materials from this blow molding operation are ground up and mixed as a homogenous scrap and the scrap layer is reintroduced into the laminate structure.

As a practical matter, therefore, the process and apparatus of this invention permits utilization of all the scrap produced during the container forming operations. Accordingly, the economy of the operation is considerably improved and waste disposal is virtually eliminated.

In addition to improving the economy of operation and reduction of waste disposal, it has been found that inclusion of a separate scrap layer in the multilayer laminate structure does not detract from the transparency of unoriented containers made of such laminate structures. The ability to make transparent containers by nonoriented blow molding of a multilayer laminate structure having a completely separate layer of scrap constitutes a novel and surprising feature of the present invention.

While the invention has heretofore been described with a certain degree of particularity and illustrated by a 6-layer laminate structure, several changes and modifications are suggested from the foregoing disclosure which are nevertheless within the scope and contemplation of this invention. For example, additional layers may be used for decorative purposes or otherwise and more than one scrap layer can be reintroduced into the laminate structure if desired.

It is also within the contemplation of this invention to make a 5-layer laminate structure, and to form containers therefrom as aforesaid. In this construction, the scrap layer may constitute the outer layer and the outer polyolefin layer may be eliminated.

Additionally, if desired, the scrap layer may be interposed between the inner polyolefin layer and the second adhesive layer, or two scrap layers may be incorporated in the laminate structure; one interposed between the outer polyolefin layer and the first adhesive layer, and the other is interposed between the inner polyolefin layer and the second adhesive layer.

Containers having excellent oxygen barrier properties and good transparency can be made by varying the relative thicknesses of the different layers. For example, excellent barrier properties and good transparency can be obtained from the multi-layer structure of this invention when the thickness of the ethylenevinyl alcohol layer is between about 0.5 to about 2 mils and the scrap layer constitutes up to about 40 weight percent of the total extrudate.

Figure 5:
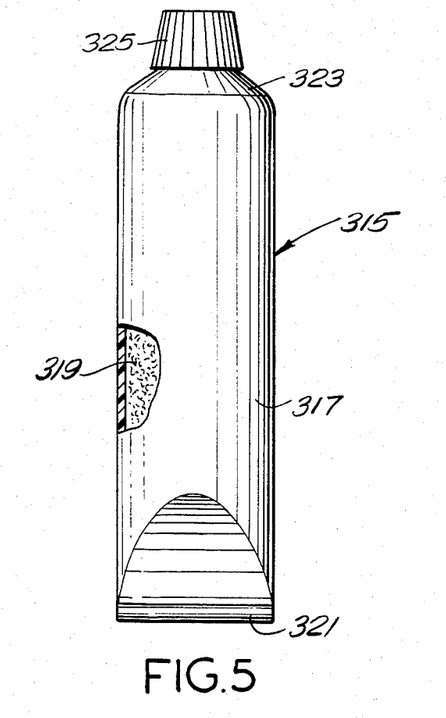
FIG. 5 is a side elevational view of a typical collapsible dispensing container with portions of the body wall broken away.

FIG. 5 shows a collapsible container generally designated as 315 having a tubular body 317 which, after filling with the product 319, is closed at its end 321 by heat sealing or some other suitable technique mounted at the opposite end of the tubular body 17 is a plastic headpiece 323 which is usually shaped to provide an externally threaded neck for threaded engagement with an internally threaded cap 25. The headpiece 323 may be fused to the tubular body 317 by a suitable procedure such as described in U.S. Pat. No. 2,673,374.

Figure 6:
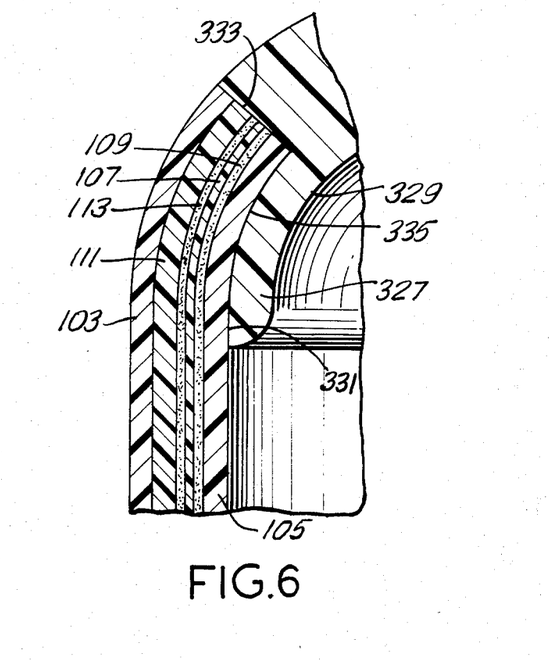
FIG. 6 is an enlarged partial sectional view showing the Joint between the container body and its headpiece illustrating the several layers of the laminate structure.

In FIG. 6, the tubular body 317 is shown to consist of six layers, laminated or otherwise bonded one to the other. The number of layers may vary, however, if desired. The layers shown in FIG. 6 are, from the outside to the inside of the tubular body:

outer layer 103 of a polyolefin
scrap layer 111
adhesive layer 113
oxygen barrier layer 107
adhesive layer 109
inner polyolefin layer 105

The nature and function of the different layers were previously discussed in connection with the description of the laminate structure shown in FIG. 4.

In bonding the headpiece 323 to the tubular body 317, headpiece 323 is provided with a cylindrical skirt portion 327 and a peripheral inwardly curved portion 329 which are bonded to the tubular body 317 and its upper marginal inner surface 331 and upper edge 333 to form a head Joint 335. The continuous peripheral and vertical fused areas of the Joint 335 result in a strong attachment of the headpiece 323 to the tubular body 317 with a high resistance to separation by either axial, radial or twisting forces, or combinations thereof. Preferably, the upper end 337 is turned in slightly and recessed into the headpiece 323 with the edge 333 of the body welded to the material of the head so that the outer surface of the Joint 335 is a smooth substantially uninterrupted surface.

What is claimed is:

1. An apparatus for producing multi-layer parisons of polymeric materials wherein at least two of said layers are relatively thin compared to at least one other layer, said apparatus comprising means including a tubular channel for forming a relatively thick layer of a first polymeric material and laminate means for forming a laminate of at least two thin layers which is thereafter fed completely around the surface of the thick layer of polymeric material, said laminate means including a segmented die block, each segment being formed with a polymeric accumulation reservoir, the die block being formed around said tubular channel having a first annular passageway of lesser diameter than said tubular channel leading from an accumulation reservoir in a first segment to an outlet orifice and adapted to be charged with a second polymeric material from said accumulation reservoir, a second annular passageway leading from an accumulation reservoir in a second segment to an outlet orifice and adapted to be charged with a third polymeric material from said accumulation reservoir, and a third annular passageway which is an elongated annular member having facing and spaced apart parallel side walls in which said laminate is formed leading from the outlet orifices of said first and second passageways and leading to said tubular channel; whereby a laminate can be formed in said third annular passageway composed of said second and third polymeric material, which laminate is thereafter fed around said first polymeric material.

2. An apparatus as in claim 1 wherein the first polymeric material is a thermoplastic polyolefin structural polymer, the second polymeric material is an adhesive polymer and the third polymeric material is an oxygen barrier layer.

3. An apparatus as in claim 1 in which there is at least one additional die block segment formed with an accumulation reservoir and a passageway leading to said tubular channel whereby the multilayer parison formed in said die block contains at least one additional layer of polymeric material.

4. An apparatus as in claim 2 in which there is an additional die block segment formed with an accumulation reservoir for an adhesive polymeric layer and a fourth annular passageway leading from said accumulation reservoir to said third passageway, and an additional die block segment formed with an accumulation reservoir for a second thermoplastic polyolefin structural layer and a passageway leading therefrom into the tubular channel downstream of the junction where the said third passageway leads into the tubular channel whereby a parison can be formed with an inner thermoplastic polyolefin layer followed outwardly by an adhesive layer, an oxygen barrier layer, and a second adhesive layer and an outer thermoplastic polyolefin layer.

5. An apparatus as in claim 4 including an additional die block segment formed with an accumulation reservoir for a scrap layer and a passageway leading therefrom into the tubular channel intermediate said third passageway and the passageway for the outer thermoplastic polyolefin layer.

6. An apparatus for producing multilayer parisons for blow molding wherein at least two of the layers are relatively thin compared to at least one other relatively thick layer, the apparatus comprising:
   a. A hollow flow tube having a hollow core pin at its forward end portion forming a hollow unit,
   b. A segmented die block comprising an extrusion die block segment at the end portion of the apparatus formed with an interior surface surrounding the core pin, but spaced apart therefrom to form a delivery channel for the flow of multiple layers of polymers, the extrusion die block segment also being formed with an annular opening at its forward portion which surrounds, but is spaced from the forward position of the core pin to form an annular opening through which the multilayer parison exits the apparatus, and c. A plurality of subextrusion die block segments vertically located behind the extrusion die block segment comprising at least one principal subextrusion die block segment formed with an annular opening of larger diameter than the diameter of the flow tube and surrounding the flow tube to form a principal tubular channel for flow of a first layer of polymeric material into the delivery channel, and at least two adjacent auxiliary subextrusion die block segments each formed with an accumulation reservoir, a first annular passageway of lesser diameter than the principal tubular channel leading from an accumulation reservoir in a first subextrusion die block segment and adapted to be charged with a second polymeric material from said first subextrusion reservoir, a second annular passageway of lesser diameter than the principal tubular channel leading from an accumulation reservoir in a second subextrusion die block segment to a junction with said first passageway and adapted to be charged with a third polymeric material from said subextrusion accumulation reservoir, and a third annular passageway which is an elongated annular member having facing and spaced apart parallel side walls, leading from said junction of said first and second passageways and leading to said principal tubular channel, said first and second passageways being defined between facing surfaces of adjacent subextrusion die block segments, whereby a laminate can be formed in said third passageway composed of said second and third polymeric material and thereafter fed through said third passageway and completely around said first polymeric material in said principal tubular channel.

7. An apparatus as in claim 6 wherein the first polymeric material is a thermoplastic polyolefin structural polymer, the second polymeric material is an adhesive polymer and the third polymeric material is an oxygen barrier layer.

8. An apparatus as in claim 6 in which there is at least one additional principal subextrusion die block segment formed with an accumulation reservoir and a fourth annular passageway leading from said accumulation reservoir to said third passageway channel whereby the multilayer parison formed in the molding apparatus contains at least one additional layer of polymeric material.

9. An apparatus as in claim 7 in which there is an additional subextrusion die block segment formed with an accumulation reservoir for an adhesive polymeric layer and a fourth annular passageway leading from said accumulation reservoir to said third passageway, and an additional principal subextrusion die block segment formed with an accumulation reservoir for a second thermoplastic polyolefin structural layer and a passageway leading therefrom into the principal tubular channel downstream of the junction where the third passageway leads into the principal tubular channel whereby a parison can be formed with an inner thermoplastic polyolefin layer followed outwardly by an adhesive layer, an oxygen barrier layer, a second adhesive layer and an outer thermoplastic polyolefin layer.

10. An apparatus as in claim 9 including an additional principal subextrusion die block segment formed with an accumulation reservoir for a scrap layer and a passageway leading therefrom into the tubular channel intermediate the third passageway and the passageway for the outer thermoplastic layer.

11. An apparatus for producing multi-layer parisons of polymeric materials wherein at least two of said layers are relatively thin compared to at least one other layer, said apparatus comprising:

a. A hollow cylindrical programming flow tube having a hollow core pin at its forward end forming a hollow unit, b. A cylindrical mandrel which fits slidably over the programming tube within which the flow tube is vertically movable, c. A segmented die block comprising an extrusion die block at the end portion of the apparatus formed with an interior surface surrounding the core pin, but spaced apart therefrom to form a delivery channel for the flow of multiple layers of polymers, the extrusion die block segment also being formed with an annular opening at its forward portion which surrounds but is spaced from the forward portion of the core pin to form an annular opening through which the multilayer parison exits the apparatus, and A plurality of subextrusion die block segments vertically located behind the extrusion die block segment comprising at least one principal subextrusion die block segment formed with an annular opening of larger diameter than the outside diameter of the mandrel and surrounding the mandrel to form a principal tubular channel for flow of a first polymeric layer of polymer material into the delivery channel, and at least two adjacent auxiliary subextrusion die block segments each formed with an accumulation reservoir, there being a first tapered annular passageway of lesser diameter than the principal tubular channel leading from an accumulation reservoir in a first subextrusion die block segment to an exit orifice and adapted to be charged with a second polymeric material from said accumulation reservoir and a second tapered annular passageway leading from an accumulation reservoir in a second subextrusion die block segment to an exit orifice and adapted to be charged with a third polymeric material from said accumulation reservoir; said first and second passageways being defined between facing surfaces of adjacent subextrusion die block segments, and a third annular passageway which is an elongated annular member having facing and spaced apart parallel side walls leading from the exit orifices of said first and second passageways and leading to said principal tubular channel, wherein a laminate can be formed in said third passageway of said auxiliary subextrusion die block segments composed of said second and third polymeric material and thereafter fed completely around said first polymeric material in said principal tubular channel.

12. An apparatus as in claim 11 wherein the first polymeric material is a thermoplastic polyolefin structural polymer, the second polymeric material is an adhesive polymer and the third polymeric material is an oxygen barrier layer.

13. An apparatus as in claim 11 in which there is at least one additional principal subextrusion die block segment formed with an accumulation reservoir and an additional annular tapered passageway leading to said principal tubular channel whereby the multilayer parison formed in the molding apparatus contains at least one additional layer of polymeric material.

14. An apparatus as in claim 11 in which there is an additional subextrusion die block segment formed with an accumulation reservoir for an adhesive polymeric layer and a fourth tapered annular passageway leading into said third passageway from said accumulation reservoir, and an additional principal subextrusion die block segment formed with an accumulation reservoir for a second thermoplastic polyolefin structural layer and a tapered annular passageway leading therefrom into the principal tubular channel downstream of the junction where the third passageway leads into the principal tubular channel whereby a parison can be formed with an inner thermoplastic polyolefin layer followed outwardly by an adhesive layer, an oxygen barrier layer, a second adhesive layer and an outer thermoplastic polyolefin layer.

15. An apparatus as in claim 14 including an additional principal subextrusion die block segment formed with an accumulation reservoir for a scrap layer and a tapered passageway leading therefrom into the tubular channel intermediate the third passageway and the passageway for the outer thermoplastic layer.

16. An apparatus as in any of claims 11 to 15 further comprising means for adjusting the size of the annular opening through which the multilayer parison exits the apparatus.

17. A method of forming a multilayer parison of at least three layers of polymeric materials by co-extrusion with an extrusion head wherein at least two of said layers are relatively thin compared to at least one other layer comprising the steps of forming the thick layer of a first liquid state polymeric material within a tubular passageway and forming a liquid state flow laminate composed of thin layers of a second and third polymeric material within a passageway which is an elongated annular passageway having facing and spaced apart parallel side walls and thereafter feeding said liquid state flow laminate completely around said liquid state thick layer prior to extrusion from said head.

* * * * *